United States Patent
Wu

(10) Patent No.: US 10,397,234 B2
(45) Date of Patent: Aug. 27, 2019

(54) METHOD AND DEVICE FOR CONTROLLING ACCESS TO DATA IN NETWORK SERVICE PROVIDER SYSTEM

(71) Applicant: Huawei Technologies Co., Ltd., Shenzhen (CN)

(72) Inventor: Hao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 318 days.

(21) Appl. No.: 15/362,145

(22) Filed: Nov. 28, 2016

(65) Prior Publication Data

US 2017/0078303 A1 Mar. 16, 2017

Related U.S. Application Data

(63) Continuation of application No. PCT/CN2014/092613, filed on Nov. 29, 2014.

(30) Foreign Application Priority Data

May 28, 2014 (CN) .......................... 2014 1 0230652

(51) Int. Cl.
*G06F 21/62* (2013.01)
*H04L 12/24* (2006.01)
(Continued)

(52) U.S. Cl.
CPC ........ *H04L 63/102* (2013.01); *G06F 21/6245* (2013.01); *H04L 29/08* (2013.01);
(Continued)

(58) Field of Classification Search
None
See application file for complete search history.

(56) References Cited

U.S. PATENT DOCUMENTS

| 5,414,844 A | 5/1995 | Wang |
| 5,907,607 A | 5/1999 | Waters et al. |

(Continued)

FOREIGN PATENT DOCUMENTS

| CN | 1552021 A | 12/2004 |
| CN | 101573944 A | 11/2009 |
| CN | 101599964 A | 12/2009 |
| CN | 103488957 A | 1/2014 |

OTHER PUBLICATIONS

Yoxi, "DuckDuckGo: Google's smallest but most powerful rival," Feb. 21, 2014, 12 pages.

*Primary Examiner* — Christopher A Revak
(74) *Attorney, Agent, or Firm* — Slater Matsil, LLP

(57) ABSTRACT

Embodiments disclose a method and a device for controlling access to data in a network service provider system. In the embodiments, when a received access request of accessing data in the network service provider system is a user access instruction, data requested by the user access instruction may be acquired from network service provider-usable data or network service provider-unusable data in the network service provider system, or when a received access request of accessing data in the network service provider system is a non-user access instruction sent by the network service provider system, data requested by the non-user access instruction is acquired from only network service provider-usable data in the network service provider system.

18 Claims, 6 Drawing Sheets

(51) Int. Cl.
*H04L 29/06* (2006.01)
*H04L 29/08* (2006.01)

(52) U.S. Cl.
CPC .......... *H04L 41/082* (2013.01); *H04L 63/123* (2013.01); *H04L 67/327* (2013.01); *G06F 2221/2141* (2013.01)

(56) References Cited

U.S. PATENT DOCUMENTS

| | | | |
|---|---|---|---|
| 7,908,292 B2 | 3/2011 | Kaarela et al. | |
| 8,296,323 B2* | 10/2012 | Pollard | G06Q 10/0637 705/44 |
| 8,660,856 B2* | 2/2014 | Lassetter | G06Q 50/22 705/2 |
| 2001/0037210 A1* | 11/2001 | Hirayama | G06Q 20/206 726/21 |
| 2002/0143961 A1 | 10/2002 | Siegel et al. | |
| 2004/0153908 A1* | 8/2004 | Schiavone | G06F 21/6245 714/712 |
| 2006/0282372 A1 | 12/2006 | Endres et al. | |
| 2008/0162637 A1* | 7/2008 | Adamczyk | H04L 51/043 709/204 |
| 2009/0012874 A1 | 1/2009 | Case | |
| 2011/0208822 A1* | 8/2011 | Rathod | G06Q 30/02 709/206 |
| 2014/0090091 A1* | 3/2014 | Prakash | G06F 21/6245 726/30 |
| 2017/0249478 A1* | 8/2017 | Lovin | G06F 21/6245 |

\* cited by examiner

METHOD AND DEVICE FOR CONTROLLING ACCESS TO DATA IN NETWORK SERVICE PROVIDER SYSTEM

CROSS-REFERENCE TO RELATED APPLICATIONS

This application is a continuation of International Application No. PCT/CN2014/092613, filed on Nov. 29, 2014, which claims priority to Chinese Patent Application No. 201410230652.4, filed on May 28, 2014. The disclosures of the aforementioned applications are hereby incorporated by reference in their entireties.

TECHNICAL FIELD

The present invention relates to the field of electronic technologies, and in particular, to a method and a device for controlling access to data in a network service provider system.

BACKGROUND

With rapid development of the Internet, a quantity of privacy right infringement cases on the Internet is increasing with each passing day. In particular, rise of "big data" in recent years causes more privacy information to be used by a network service provider system (including an electronic commerce system) for commercial purposes such as data mining, and abuse of the privacy information affects healthy development of the entire Internet industry. Therefore, a voice for protecting a network privacy right is becoming louder, and countries successively put an issue of protecting the network privacy right on the agenda.

For an existing network service provider of the Internet, privacy data of a user is a digital asset of the network service provider, and is the core competency of the network service provider. Therefore, the network service provider has no motivation to really control use of the privacy data, and particularly control use of the privacy data by a system of the network service provider.

In a conventional technology, consumption record information of a credit card is divided into two portions: a public portion and a private portion. When needing to access a private portion of information of a credit card user, another user needs to be authorized by the user before the another user accesses the private portion.

In another conventional technology, an electronic transaction system that supports privacy is provided. In this system, a portion of private information (which is divided into three grades: public, private, and network private) may be reserved for commodities of a buyer and a seller. The portion of private information is invisible to the outside. An electronic commerce system performs matching, and if finding that the private information can match, the electronic commerce system notifies the buyer or the seller in another way, thereby making a match for a transaction.

A disadvantage of the foregoing conventional technologies is that, no control over permission on privacy data is performed on the network service provider system.

SUMMARY

Embodiments of the present invention provide a method and a device for controlling access to data in a network service provider system, which can limit access by a network service provider to data in the network service provider system, to protect data privacy.

A first aspect of the embodiments of the present invention provides a method for controlling access to data. The method may include receiving an access request of accessing data in a network service provider system. The method may also include when the access request is a user access instruction, acquiring, from network service provider-usable data or network service provider-unusable data in the network service provider system, data requested by the user access instruction; or when the access request is a non-user access instruction sent by the network service provider system, acquiring, from network service provider-usable data in the network service provider system, data requested by the non-user access instruction.

With reference to the first aspect, in a first feasible implementation manner, the method further includes: setting access permission on the network service provider-usable data to be accessible by both the user access instruction and the non-user access instruction that is sent by the network service provider system; and setting access permission on the network service provider-unusable data to be accessible by the user access instruction.

With reference to the first feasible implementation manner of the first aspect, in a second feasible implementation manner, the method further includes: receiving a setting instruction entered by a user, and dividing data in the network service provider system into data types according to the setting instruction, where the data types include: network service provider-usable data or network service provider-unusable data; or receiving an update instruction entered by a user, and changing some of or all of the network service provider-usable data in the network service provider system into network service provider-unusable data according to the update instruction; or receiving an update instruction entered by a user, and changing some of or all of the network service provider-unusable data in the network service provider system into network service provider-usable data according to the update instruction.

With reference to the second feasible implementation manner of the first aspect, in a third feasible implementation manner, the receiving a setting instruction entered by a user, and dividing data in the network service provider system into data types according to the setting instruction may include: when or after the user logs in to the network service provider system to perform a network operation and the network service provider system generates operation data, receiving the setting instruction entered by the user, and dividing, according to the setting instruction, the operation data generated by the network service provider system into data types, where the data types include: network service provider-usable data or network service provider-unusable data.

With reference to any one of the first aspect to the third feasible implementation manner of the first aspect, in a fourth feasible implementation manner, when the data requested by the user access instruction is acquired from the network service provider-usable data or the network service provider-unusable data in the network service provider system, the data requested by the user access instruction is separately acquired from the network service provider-usable data or the network service provider-unusable data in the network service provider system by using different access interfaces.

With reference to any one of the first aspect to the third feasible implementation manner of the first aspect, in a fifth feasible implementation manner, the method further includes: verifying verification information entered by the user, and if the verification information entered by the user is correct, acquiring, from the network service provider-unusable data in the network service provider system, the data requested by the user access instruction; otherwise, skipping acquiring, from the network service provider-unusable data in the network service provider system, the data requested by the user access instruction.

With reference to any one of the first aspect to the fifth feasible implementation manner of the first aspect, in a sixth feasible implementation manner, the network service provider-usable data is stored in a network service provider-usable data area, and the network service provider-unusable data is stored in a network service provider-unusable data area, where the network service provider-usable data area and the network service provider-unusable data area are independent from each other.

A second aspect of the embodiments of the present invention provides a device for controlling access to data. The device may include: a receiving module, configured to receive an access request of accessing data in a network service provider system; and an access control module, configured to: when the access request received by the receiving module is a user access instruction, acquire, from network service provider-usable data or network service provider-unusable data in the network service provider system, data requested by the user access instruction; or when the access request received by the receiving module is a non-user access instruction sent by the network service provider system, acquire, from network service provider-usable data in the network service provider system, data requested by the non-user access instruction.

With reference to the second aspect, in a first feasible implementation manner, the device further includes: a privacy management module, configured to set access permission on the network service provider-usable data to be accessible by both the user access instruction and the non-user access instruction that is sent by the network service provider system; and set access permission on the network service provider-unusable data to be accessible by the user access instruction.

With reference to the first feasible implementation manner of the second aspect, in a second feasible implementation manner, the privacy management module is further configured to receive a setting instruction entered by a user, and divide data in the network service provider system into data types according to the setting instruction, where the data types include: network service provider-usable data or network service provider-unusable data; or receive an update instruction entered by a user, and change some of or all of the network service provider-usable data in the network service provider system into network service provider-unusable data according to the update instruction; or receive an update instruction entered by a user, and change some of or all of the network service provider-unusable data in the network service provider system into network service provider-usable data according to the update instruction.

With reference to the second feasible implementation manner of the second aspect, in a third feasible implementation manner, the privacy management module is specifically configured to: when or after the user logs in to the network service provider system to perform a network operation and the network service provider system generates operation data, receive the setting instruction entered by the user, and divide, according to the setting instruction, the data in the network service provider system into data types, where the data types include: network service provider-usable data or network service provider-unusable data.

With reference to the second aspect to the third feasible implementation manner of the second aspect, in a fourth feasible implementation manner, the access control module includes: a first access module, configured to: when the access request received by the receiving module is a user access instruction, acquire, from the network service provider-usable data in the network service provider system, the data requested by the user access instruction; or when the access request received by the receiving module is a non-user access instruction sent by the network service provider system, acquire, from the network service provider-usable data in the network service provider system, the data requested by the non-user access instruction; and a second access module, configured to: when the access request received by the receiving module is a user access instruction, acquire, from the network service provider-unusable data in the network service provider system, the data requested by the user access instruction.

With reference to the fourth feasible implementation manner of the second aspect, in a fifth feasible implementation manner, the first access module and the second access module are access interfaces independent from each other.

With reference to the fourth feasible implementation manner of the second aspect, in a sixth feasible implementation manner, the device further includes: a verification module, configured to: before the second access module acquires, from the network service provider-unusable data in the network service provider system, the data requested by the user access instruction, verify whether verification information entered by the user is correct, and if the verification information entered by the user is correct, trigger the second access module to acquire, from the network service provider-unusable data in the network service provider system, the data requested by the user access instruction; or if the verification information entered by the user is incorrect, skip triggering the second access module to acquire, from the network service provider-unusable data in the network service provider system, the data requested by the user access instruction.

With reference to any one of the second aspect to the sixth feasible implementation manner of the second aspect, in a seventh feasible implementation manner, the device further includes: a storage module, configured to store the network service provider-usable data into a network service provider-usable data area, and store the network service provider-unusable data into a network service provider-unusable data area, where locations, in the storage module, of the network service provider-usable data area and the network service provider-unusable data area are independent from each other.

It can be seen from the foregoing that, in the embodiments of the present invention, when a received access request of accessing data in the network service provider system is a user access instruction, data requested by the user access instruction may be acquired from network service provider-usable data or network service provider-unusable data in the network service provider system, and when a received access request of accessing data in the network service provider system is a non-user access instruction sent by the network service provider system, data requested by the non-user access instruction is acquired from only network service provider-usable data in the network service provider system, that is, in the embodiments of the present invention, the non-user access instruction sent by the network service provider system can access only the network service provider-usable data, and cannot access the network service provider-unusable data. In this way, in the embodiments of the present invention, access by a network service provider to some data in the network service provider system can be limited, to protect data privacy; data that is not expected to be accessed by the network service provider simply needs to be set to network service provider-unusable data, and then, an effect of protecting privacy of the data may be achieved by implementing the embodiments of the present invention.

DETAILED DESCRIPTION OF ILLUSTRATIVE EMBODIMENTS

Embodiments of the present invention provide a method and a device for controlling access to data in a network service provider system. Data that is not expected or not allowed to be accessed by a network service provider may be set to network service provider-unusable data, and data that is allowed to be accessed by the network service provider may be set to network service provider-usable data. In this way, in the embodiments of the present invention, access by the network service provider to some data in the network service provider system can be limited, to protect data privacy.

Figure 1:
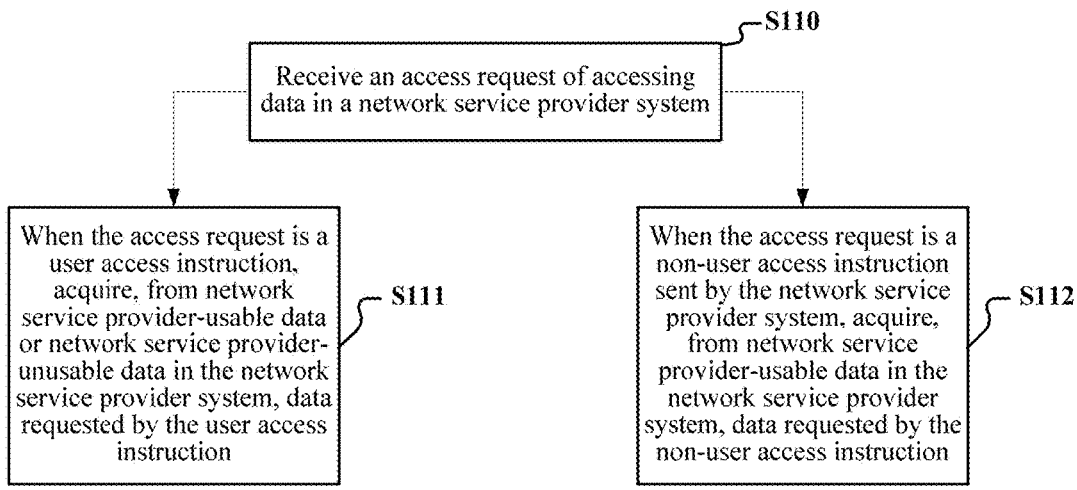
FIG. 1 is a schematic flowchart of an embodiment of a method for controlling access to data in a network service provider system according to an embodiment of the present invention.

FIG. 1 is a schematic flowchart of an embodiment of a method for controlling access to data in a network service provider system according to an embodiment of the present invention. As shown in FIG. 1, the method for controlling access to data in a network service provider system may include the following steps.

Step S110: Receive an access request of accessing the data in the network service provider system.

In a specific implementation, a network service provider in this embodiment of the present invention may include an Internet service provider (ISP) and an owner, other than two transactional parties, of an electronic commerce transaction system (which may be briefly referred to as an electronic commerce system) in an electronic commerce (EC) activity. Generally, the Internet service provider refers to a company that provides an Internet service, can provide services such as a dial-up access service, on-line browsing, file downloading, and email receiving and sending, and is an entrance and a bridge for a network end user to access the Internet. The ISP provides an Internet connection service to families and commercial users. There are four types of ISPs: a local ISP, a regional ISP, a national ISP, and a global ISP. The ISP is generally a local service provider, and provides Internet access and support to a customer. The regional and national providers that provide bandwidth, transfer, and routing services are more properly referred to as NSPs (network service providers). In most cases, an interconnection scheme is hierarchical, where the local ISP accesses the regional NSP, and then, successively accesses the national and global NSPs. Generally, the electronic commerce refers to: business and trade activities carried out globally by using electronic tools such as the Internet (these tools include telegram, telephone, broadcast, television, fax, computer, computer network, mobile communication, and the like). The electronic commerce transaction system refers to a totality of information network systems that provide, in an electronic commerce activity, a service of making a match for a transaction and a related service to two parties or multiple parties of the transaction.

In a specific implementation, more or less personal information, for example, a network account of a user, a name of the user, contact information, a purchase record and a payment record of the user, and the like, of the user remains in the network service provider system due to login by the user to a website, performing of an electronic commerce activity, downloading of a file, or the like. If no limitation is performed on the foregoing personal information of the user, a network service provider may use the personal information to carry out a commercial activity such as data mining, for example, leaking the name, a telephone number, a contact address, or the like, of the user. Abuse of the privacy affects healthy development of the entire Internet industry. In view of this, in this embodiment of the present invention, a limitation on access permission of a network service provider on some important data is implemented by managing data in a network service provider system by category.

In a specific implementation, in this embodiment of the present invention, in step S110, the received access request of accessing the data in the network service provider system may be a user access instruction that is sent to the network service provider system by a user after the user logs in to the network service provider system (for example, an electronic commerce transaction system such as Taobao) by using a user terminal device. The user access instruction may include all information, such as a query for a transaction record, a query for a product information browsing history record, statistics on a quantity of purchased commodities, and personal registration materials of the user, that is related to the user and that may be stored in the network service provider system. For example, a received access request may be an access instruction sent by the user to view a commodity browsing record. Certainly, in this embodiment of the present invention, in step S110, the received access request of accessing the data in the network service provider system may be a non-user access instruction sent by a controller (for example, a data administrator of the electronic commerce transaction system) of the network service provider system by using a non-user interaction module in the network service provider system. For the electronic commerce transaction system, these non-user interaction modules may include: a data mining module, a user marketing module, an advertisement push module, and the like. These non-user access instructions may include: any access instruction that can be used by these modules, such as an instruction to query a quantity of sellers or an instruction to view a user ID.

Step S111: When the access request is a user access instruction, acquire, from network service provider-usable data or network service provider-unusable data in the network service provider system, data requested by the user access instruction.

Step S112: When the access request is a non-user access instruction sent by the network service provider system, acquire, from network service provider-usable data in the network service provider system, data requested by the non-user access instruction.

In a specific implementation, a limitation on access permission of a network service provider on some important data is implemented by managing data in a network service provider system by category. In this embodiment of the present invention, it may be that, a setting instruction entered by a user is received, and data in the network service provider system is divided into data types according to the setting instruction, where the data types include: network service provider-usable data or network service provider-unusable data; access permission on the network service provider-usable data is set to be accessible by both a user access instruction and a non-user access instruction that is sent by the network service provider system; and access permission on the network service provider-unusable data is set to be accessible by the user access instruction. In a specific implementation, in this embodiment of the present invention, it may be that, when or after the user logs in to the network service provider system to perform a network operation and the network service provider system generates operation data, the setting instruction entered by the user is received, and the operation data generated by the network service provider system is divided into data types according to the setting instruction, where the data types include: network service provider-usable data or network service provider-unusable data. Using an electronic commerce transaction system as an example, a user (including either of two parties of a transaction) may log in to the electronic commerce transaction system, and perform a network operation, such as commodity browsing or commodity purchasing, in the electronic commerce transaction system; when the network operation such as the commodity browsing or the commodity purchasing is performed, operation information such as a browsing record and a purchasing record is generated in the electronic commerce transaction system; therefore, in this embodiment of the present invention, it may be that, in or after a process in which the user performs the network operation, such as the commodity browsing or the commodity purchasing, in the electronic commerce transaction system, division of data types and setting of access permission on network service provider-usable data and network service provider-unusable data are performed on related operation interfaces.

For example, operation interfaces shown in FIG. 2 to FIG. 5 show schematic diagrams for a transaction party of electronic commerce to set data types of and access permission on, in an electronic commerce transaction system, various data generated by an electronic commerce activity performed by the transaction party.

Figure 2:
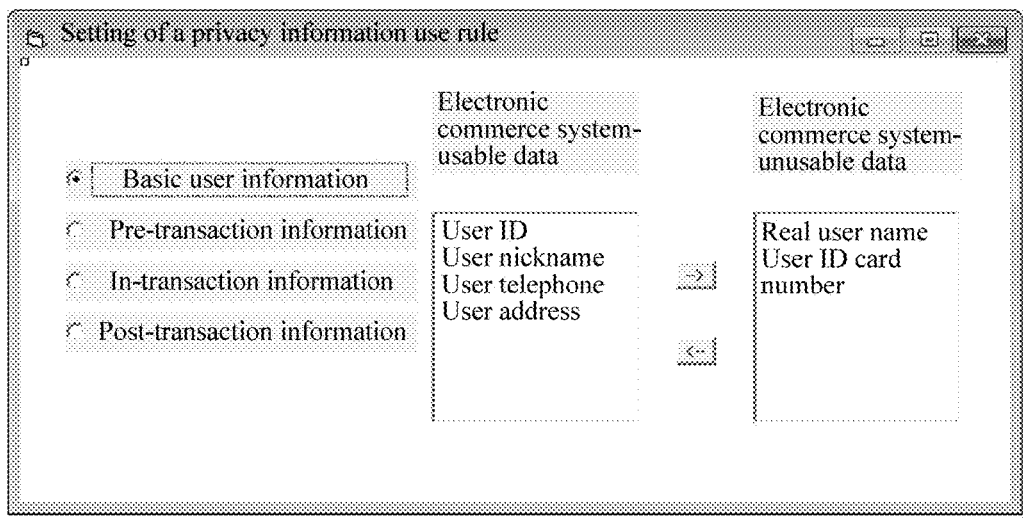
FIG. 2 to FIG. 5 are schematic setting diagrams of an embodiment of data types and access permission of a network service provider according to an embodiment of the present invention.

Specifically, referring to the operation interface shown in FIG. 2, data generated by an electronic commerce transaction activity of a user is roughly divided into basic user information, pre-transaction information, in-transaction information, and post-transaction information. In FIG. 2, data types of the basic user information are set, where in the basic information, information such as a user ID, a user nickname, and a user address is set to electronic commerce system-usable data, and important information, such as a real user name and a user ID card number, related to user privacy, is set to electronic commerce system-unusable data. In addition, on a background, in this embodiment of the present invention, access permission on the electronic commerce system-usable data and the electronic commerce system-unusable data are set to be accessible by a user access instruction, and the electronic commerce system-usable data is set to be accessible by a user access instruction and a non-user access instruction that is sent by an electronic commerce system. Therefore, a limitation on access permission of the electronic commerce system on the important data, such as the real user name and the user ID card number, in the basic user information is implemented by managing the basic user information by category.

Figure 3:
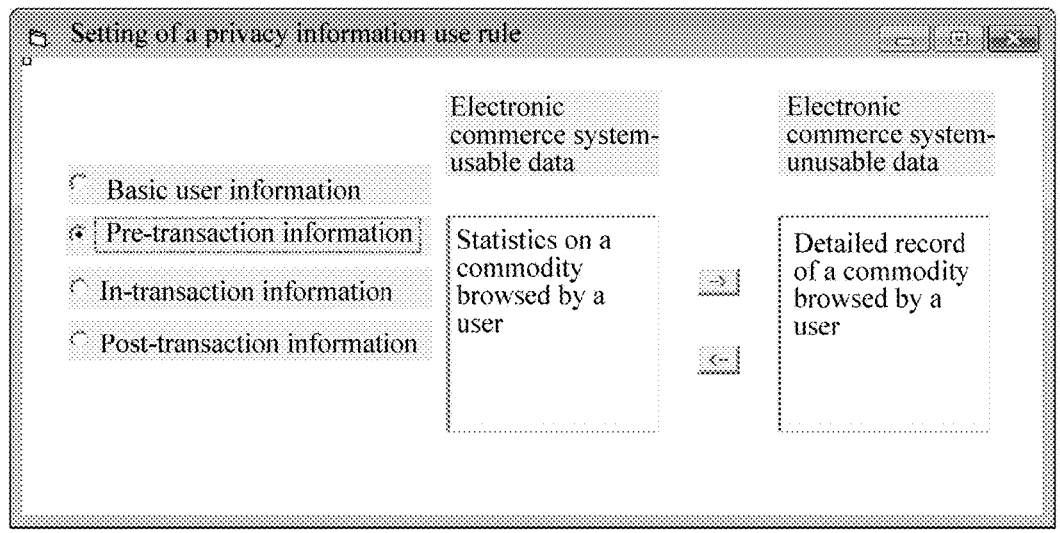

Refer to the operation interface shown in FIG. 3, which shows an interface for setting data types of the pre-transaction information of it. In FIG. 3, statistics on a commodity browsed by a user are set to electronic commerce system-usable data, and a detailed record of a commodity browsed by a user is set to electronic commerce system-unusable data, where the "statistics on a commodity browsed by a user" refer to statistics on browsing information before the user purchases a commodity before ordering, and may be further subdivided into "statistics by browsed commodity", "statistics by user ID", "statistics by time period", and the like; the "detailed information about a commodity browsed by a user" refers to a complete detailed record of browsing information before the user purchases a commodity before ordering, and statistics at dimensions may be generated on the basis of the complete detailed record. In addition, on the background, in this embodiment of the present invention, access permission on the electronic commerce system-usable data and the electronic commerce system-unusable data are set to be accessible by a user access instruction, and the electronic commerce system-usable data is set to be accessible by all non-user access instructions sent by an electronic commerce system. Therefore, a limitation on access permission of the electronic commerce system on the important data, such as the "detailed record of a commodity browsed by a user", in the pre-transaction information is implemented by managing the pre-transaction information by category.

Specifically, if the user does not allow the electronic commerce system to use the "detailed information about a commodity browsed by a user", but allows the electronic commerce system to use a portion (for example, the "statistics by browsed commodity") of the "statistics on a commodity browsed by a user", a detailed record of a browsing process of the user may be stored only in the "electronic commerce system-unusable data", and additionally the "statistics on a commodity browsed by a user" is dynamically generated and stored in the "electronic commerce system-usable data"; if the user allows the electronic commerce system to use the "detailed information about a commodity browsed by a user", the information is stored in the "electronic commerce system-usable data". Authorizing the electronic commerce system to use the statistics is beneficial for the electronic commerce system to normally carry out business of the electronic commerce system on one hand, and can also shield some sensitive information of the user on the other hand.

Figure 4:
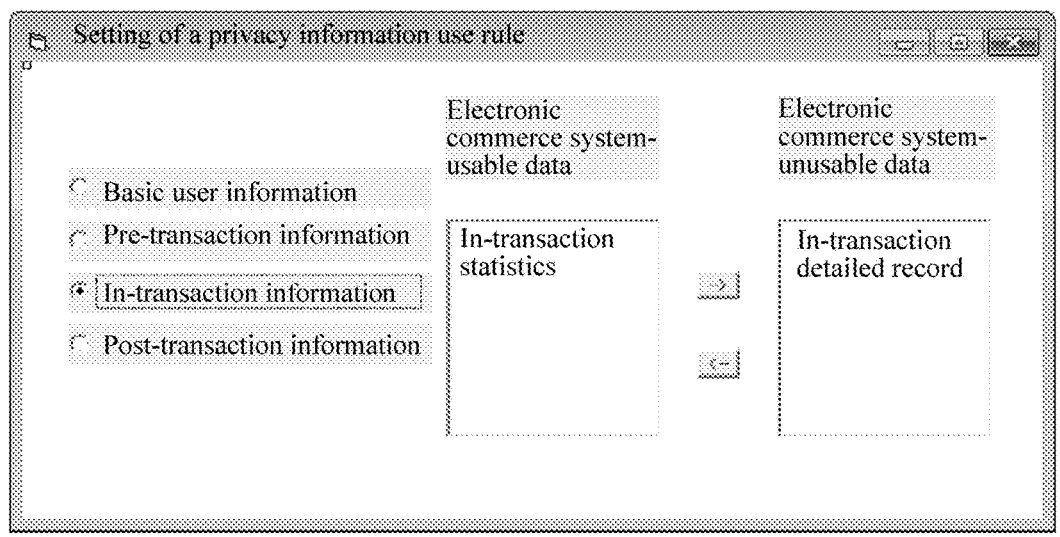

Refer to the operation interface shown in FIG. 4, which shows an interface for setting data types of the in-transaction information of it. In FIG. 4, in-transaction statistics are set to electronic commerce system-usable data, and an in-transaction detailed record is set to electronic commerce system-unusable data, where the "in-transaction statistics" refer to statistics that are in a process of a transaction and that are under the name of the user, and may be further subdivided into "statistics by traded commodity", "statistics by user ID", "statistics by time period", "statistics by transaction price", and the like; the "in-transaction detailed information" refers to a detailed record that is in a process of a transaction and that is under the name of the user, and statistics at dimensions may be generated on the basis of the complete detailed record. In addition, on the background, in this embodiment of the present invention, access permission on the electronic commerce system-usable data and the electronic commerce system-unusable data are set to be accessible by a user access instruction, and the electronic commerce system-usable data is set to be accessible by all non-user access instructions sent by an electronic commerce system. Therefore, a limitation on access permission of the electronic commerce system on the important data, such as the "in-transaction detailed record", in the in-transaction information is implemented by managing the in-transaction information by category.

Specifically, if the user does not allow the electronic commerce system to use the "in-transaction detailed information", but allows the electronic commerce system to use a portion (for example, the "statistics by traded commodity") of the "in-transaction statistics", a detailed record in a transaction of the user may be stored only in the "electronic commerce system-unusable data", and additionally the "statistics by traded commodity" is dynamically generated and stored in an "electronic commerce system-usable data area"; if the user allows the electronic commerce system to use the "in-transaction detailed information", the information is stored in the "electronic commerce system-usable data area".

Figure 5:
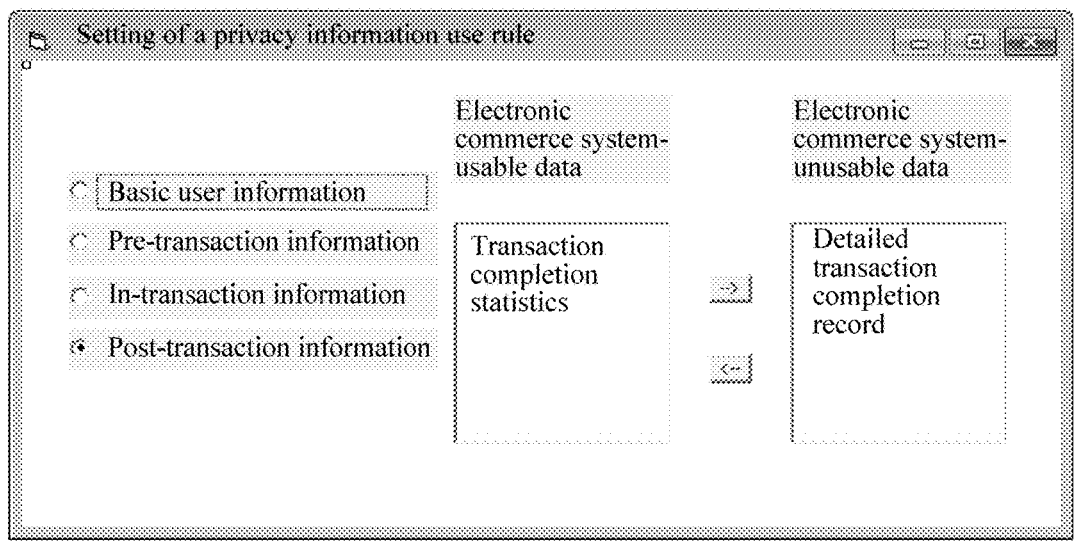

Refer to the operation interface shown in FIG. 5, which shows an interface for setting data types of the in-transaction information of it. In FIG. 5, transaction completion statistics are set to electronic commerce system-usable data, and a detailed transaction completion record is set to electronic commerce system-unusable data, where the "transaction completion statistics" refer to statistics that are on a completed transaction and that are under the name of the user, and may be further subdivided into "statistics by traded commodity", "statistics by user ID", "statistics by time period", "statistics by transaction price", and the like; the "detailed transaction completion information" refers to a detailed record that is on a completed transaction and that is under the name of the user, and statistics at dimensions may be generated on the basis of the complete detailed record.

Specifically, if the user does not allow the electronic commerce system to use the "detailed transaction completion information", but allows the electronic commerce system to use a portion (for example, the "statistics by traded commodity") of the "transaction completion statistics", a detailed transaction completion record of the user may be stored only in the "electronic commerce system-unusable data", and additionally the "statistics by traded commodity" is dynamically generated and stored in the "electronic commerce system-usable data"; if the user allows the electronic commerce system to use the "detailed transaction completion information", the information is stored in the "electronic commerce system-usable data".

In a specific implementation, in this embodiment of the present invention, the network service provider-usable data may be stored in a network service provider-usable data area, and the network service provider-unusable data may be stored in a network service provider-unusable data area, where the network service provider-usable data area and the network service provider-unusable data area are independent from each other.

In a specific implementation, in step S111, according to a specific location at which the data requested by the user access instruction is stored, in this embodiment of the present invention, any one of the following operations may be performed:

Operation 1: Acquire, from the network service provider-usable data in the network service provider system, the data requested by the user access instruction. For example, it is assumed that the user access instruction is to view a user ID in basic user information; and then, in step S111, the user ID may be acquired from the electronic commerce system-usable data in the electronic commerce transaction system.

Operation 2: Acquire, from the network service provider-unusable data in the network service provider system, the data requested by the user access instruction. For example, it is assumed that the user access instruction is to view a detailed record of commodities browsed by a user; and then, in step S111, the detailed record, of the user, of commodities browsed by the user may be acquired from the electronic commerce system-unusable data in the electronic commerce transaction system.

Operation 3: Acquire, from the network service provider-usable data and the network service provider-unusable data in the network service provider system, the data requested by the user access instruction. For example, it is assumed that the user access instruction is to view a detailed record of commodities browsed by a user and a user ID; and then, in step S111, the detailed record, of the user, of commodities browsed by the user may be acquired from the electronic commerce system-unusable data in the electronic commerce transaction system, and the user ID may be acquired from the electronic commerce system-usable data in the electronic commerce transaction system.

In a specific implementation, in this embodiment of the present invention, in step S111, when the data requested by the user access instruction is acquired from the network service provider-usable data or the network service provider-unusable data in the network service provider system, the data requested by the user access instruction may be separately acquired from the network service provider-usable data or the network service provider-unusable data in the network service provider system by using different access interfaces. That is, in this embodiment of the present invention, different access interfaces may be set to separately access the network service provider-usable data and the network service provider-unusable data.

In a specific implementation, in this embodiment of the present invention, before the acquiring, from the network service provider-unusable data in the network service provider system, the data requested by the user access instruction, the method may further include: verifying verification information entered by the user, and if the verification information entered by the user is correct, acquiring, from the network service provider-unusable data in the network service provider system, the data requested by the user access instruction; otherwise, skipping acquiring, from the network service provider-unusable data in the network service provider system, the data requested by the user access instruction. In this embodiment of the present invention, by using an enhanced verification mechanism, security of the data, that is, the network service provider-unusable data is further ensured, and unauthorized access of an unauthorized user is prevented.

In a specific implementation, by means of the method in this embodiment of the present invention, it may further be that, some of or all of the network service provider-usable data in the network service provider system is changed into network service provider-unusable data according to an update instruction of a user; or some of or all of the network service provider-unusable data in the network service provider system is changed into network service provider-usable data according to an update instruction of a user. Still referring to the operation interfaces shown in FIG. 2 to FIG. 5, in FIG. 2 to FIG. 5, a user may perform sending of an update instruction by operating directional buttons "->" and "<-"; specifically, in FIG. 2 to FIG. 5, when the user clicks a piece of information in electronic commerce system-usable data, and clicks "->", in this embodiment of the present invention, the information clicked by the user may be moved from an "electronic commerce system-usable data" list to an "electronic commerce system-usable data" list according to operations performed by the user; accordingly, when the user clicks a piece of information in electronic commerce system-unusable data, and clicks "<-", in this embodiment of the present invention, the information clicked by the user may be moved from the "electronic commerce system-unusable data" list to the "electronic commerce-usable data" list according to operations performed by the user. For example, in FIG. 2, when a user clicks "user telephone" information in electronic commerce system-usable data, and clicks "->", in this embodiment of the present invention, the "user telephone" clicked by the user may be moved from an "electronic commerce system-usable data" list to an "electronic commerce system-usable data" list according to operations performed by the user; accordingly, when the user clicks "user ID card number" in electronic commerce system-unusable data, and clicks "<-", in this embodiment of the present invention, the "user ID card number" may be moved from the "electronic commerce system-unusable data" list to the "electronic commerce-usable data" list according to operations performed by the user.

In a specific implementation, in this embodiment of the present invention, an operation, for example, dividing, according to a setting instruction of a user, data in the network service provider system into data types, where the data types include: network service provider-usable data or network service provider-unusable data; or changing some of or all of the network service provider-usable data in the network service provider system into network service provider-unusable data according to an update instruction of a user; or changing some of or all of the network service provider-unusable data in the network service provider system into network service provider-usable data according to an update instruction of a user, may occur before the access request of accessing the data in the network service provider system is received, where the received access request of accessing the data in the network service provider system may be an access request received for the first time or an access request subsequently received.

It can be seen that, by means of the method in this embodiment of the present invention, when a received access request of accessing data in the network service provider system is a user access instruction, data requested by the user access instruction may be acquired from network service provider-usable data or network service provider-unusable data in the network service provider system, and when a received access request of accessing data in the network service provider system is a non-user access instruction sent by the network service provider system, data requested by the non-user access instruction is acquired from only network service provider-usable data in the network service provider system, that is, in this embodiment of the present invention, the non-user access instruction sent by the network service provider system can access only the network service provider-usable data, and cannot access the network service provider-unusable data. In this way, in this embodiment of the present invention, access by a network service provider to some data in the network service provider system can be limited, to protect data privacy; data that is not expected to be accessed by the network service provider simply needs to be set to network service provider-unusable data, and then, an effect of protecting privacy of the data may be achieved by implementing this embodiment of the present invention.

On the basis of the foregoing method embodiment, an embodiment of the present invention further provides a device that may be configured to implement the foregoing method embodiment. The following describes embodiments of the device in this embodiment of the present invention by using an example.

Figure 6:
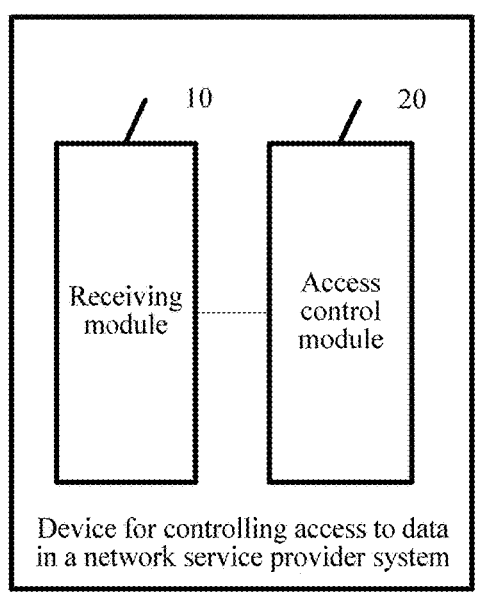
FIG. 6 is a schematic structural composition diagram of an embodiment of a device for controlling access to data in a network service provider system according to an embodiment of the present invention.

FIG. 6 is a schematic structural composition diagram of an embodiment of a device for controlling access to data in a network service provider system according to an embodiment of the present invention. As shown in FIG. 6, the device for controlling access to data in a network service provider system in the present invention may include at least: a receiving module 10 and an access control module 20, where the receiving module 10 is configured to receive an access request of accessing data in a network service provider system; and the access control module 20 is configured to: when the access request received by the receiving module 10 is a user access instruction, acquire, from network service provider-usable data or network service provider-unusable data in the network service provider system, data requested by the user access instruction; or when the access request received by the receiving module 10 is a non-user access instruction sent by the network service provider system, acquire, from network service provider-usable data in the network service provider system, data requested by the non-user access instruction.

In a specific implementation, the network service provider in this embodiment of the present invention may include an Internet service provider (ISP) and an owner, other than two transactional parties, of an electronic commerce transaction system (which may be briefly referred to as an electronic commerce system) in an electronic commerce (EC) activity. Generally, the Internet service provider refers to a company that provides an Internet service, can provide services such as a dial-up access service, on-line browsing, file downloading, and email receiving and sending, and is an entrance and a bridge for a network end user to access the Internet. The ISP provides an Internet connection service to families and commercial users. There are four types of ISPs: a local ISP, a regional ISP, a national ISP, and a global ISP. The ISP is generally a local service provider, and provides Internet access and support to a customer. The regional and national providers that provide bandwidth, transfer, and routing services are more properly referred to as NSPs (network service providers). In most cases, an interconnection scheme is hierarchical, where the local ISP accesses the regional NSP, and then, successively accesses the national and global NSPs. Generally, the electronic commerce refers to: business and trade activities carried out globally by using electronic tools such as the Internet (these tools include telegram, telephone, broadcast, television, fax, computer, computer network, mobile communication, and the like). The electronic commerce transaction system refers to a totality of information network systems that provide, in an electronic commerce activity, a service of making a match for a transaction and a related service to two parties or multiple parties of the transaction.

In a specific implementation, more or less personal information, for example, a network account of a user, a name of the user, contact information, a purchase record and a payment record of the user, and the like, of the user remains in the network service provider system due to login by the user to a website, performing of an electronic commerce activity, downloading of a file, or the like. If no limitation is performed on the foregoing personal information of the user, a network service provider may use the personal information to carry out a commercial activity such as data mining, for example, leaking the name, a telephone number, a contact address, or the like, of the user. Abuse of the privacy affects healthy development of the entire Internet industry. In view of this, in this embodiment of the present invention, a limitation on access permission of a network service provider on some important data is implemented by managing data in a network service provider system by category.

In a specific implementation, in this embodiment of the present invention, the access request, which is received by the receiving module 10, of accessing the data in the network service provider system may be a user access instruction that is sent to the network service provider system by a user after the user logs in to the network service provider system (for example, an electronic commerce transaction system such as Taobao) by using a user terminal device. The user access instruction may include all information, such as a query for a transaction record, a query for a product information browsing history record, statistics on a quantity of purchased commodities, and personal registration materials of the user, that is related to the user and that may be stored in the network service provider system. For example, a received access request may be an access instruction sent by the user to view a commodity browsing record. Certainly, in this embodiment of the present invention, the access request, which is received by the receiving module 10, of accessing the data in the network service provider system may be a non-user access instruction sent by a controller (for example, a data administrator of the electronic commerce transaction system) of the network service provider system by using a non-user interaction module in the network service provider system. For the electronic commerce transaction system, these non-user interaction modules may include: a data mining module, a user marketing module, an advertisement push module, and the like. These non-user access instructions may include: any access instruction that can be used by these modules, such as an instruction to query a quantity of sellers or an instruction to view a user ID.

Figure 7:
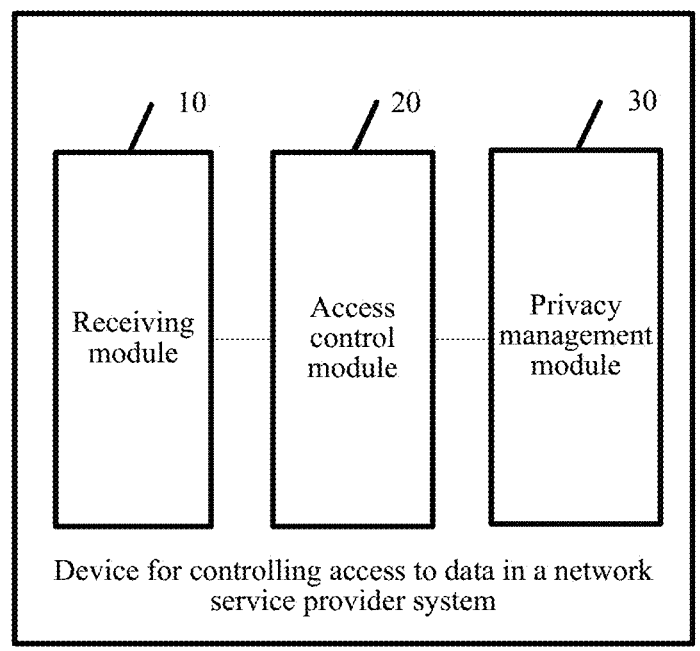
FIG. 7 is a schematic structural composition diagram of another embodiment of a device for controlling access to data in a network service provider system according to an embodiment of the present invention.

As shown in FIG. 7, in another embodiment, the device for controlling access to data in a network service provider system in the present invention may further include a privacy management module 30, configured to receive a setting instruction entered by a user, and divide data in the network service provider system into data types according to the setting instruction, where the data types include: network service provider-usable data or network service provider-unusable data; set access permission on the network service provider-usable data to be accessible by both the user access instruction and the non-user access instruction that is sent by the network service provider system; and set access permission on the network service provider-unusable data to be accessible by the user access instruction. In a specific implementation, when or after the user logs in to the network service provider system to perform a network operation and the network service provider system generates operation data, the privacy management module 30 may divide the operation data generated by the network service provider system into data types according to the setting instruction, where the data types include: network service provider-usable data or network service provider-unusable data. Using an electronic commerce transaction system as an example, a user (including either of two parties of a transaction) may log in to the electronic commerce transaction system, and perform a network operation, such as commodity browsing or commodity purchasing, in the electronic commerce transaction system; when the network operation such as the commodity browsing or the commodity purchasing is performed, operation information such as a browsing record and a purchasing record is generated in the electronic commerce transaction system; therefore, in this embodiment of the present invention, in or after a process in which the user performs the network operation, such as the commodity browsing or the commodity purchasing, in the electronic commerce transaction system, the user (including either of the two parties of the transaction) logs in to the privacy management module 30 of the electronic commerce transaction system, and a setting instruction of the user is received on a related operation interface provided by the privacy management module 30, to perform division of data types and setting of access permission on network service provider-usable data and network service provider-unusable data.

For example, operation interfaces shown in FIG. 2 to FIG. 5 show schematic diagrams for a transaction party of electronic commerce to set data types of and access permission on, in an electronic commerce transaction system, various data generated by an electronic commerce activity performed by the transaction party.

Specifically, referring to the operation interface shown in FIG. 2, data generated by an electronic commerce transaction activity of a user is roughly divided into basic user information, pre-transaction information, in-transaction information, and post-transaction information. In FIG. 2, data types of the basic user information are set, where in the basic information, information such as a user ID, a user nickname, and a user address is set to electronic commerce system-usable data, and important information, such as a real user name and a user ID card number, related to user privacy, is set to electronic commerce system-unusable data. In addition, on a background, in this embodiment of the present invention, access permission on the electronic commerce system-usable data and the electronic commerce system-unusable data are set to be accessible by a user access instruction, and the electronic commerce system-usable data is set to be accessible by all non-user access instructions sent by an electronic commerce system. Therefore, a limitation on access permission of the electronic commerce system on the important data, such as the real user name and the user ID card number, in the basic user information is implemented by managing the basic user information by category.

Refer to the operation interface shown in FIG. 3, which shows an interface for setting data types of the pre-transaction information of it. In FIG. 3, statistics on a commodity browsed by a user are set to electronic commerce system-usable data, and a detailed record of a commodity browsed by a user is set to electronic commerce system-unusable data, where the "statistics on a commodity browsed by a user" refer to statistics on browsing information before the user purchases a commodity before ordering, and may be further subdivided into "statistics by browsed commodity", "statistics by user ID", "statistics by time period", and the like; the "detailed information about a commodity browsed by a user" refers to a complete detailed record of browsing information before the user purchases a commodity before ordering, and statistics at dimensions may be generated on the basis of the complete detailed record. In addition, on the background, in this embodiment of the present invention, access permission on the electronic commerce system-usable data and the electronic commerce system-unusable data are set to be accessible by a user access instruction, and the electronic commerce system-usable data is set to be accessible by all non-user access instructions sent by an electronic commerce system. Therefore, a limitation on access permission of the electronic commerce system on the important data, such as the "detailed record of a commodity browsed by a user", in the pre-transaction information is implemented by managing the pre-transaction information by category.

Specifically, if the user does not allow the electronic commerce system to use the "detailed information about a commodity browsed by a user", but allows the electronic commerce system to use a portion (for example, the "statistics by browsed commodity") of the "statistics on a commodity browsed by a user", a detailed record of a browsing process of the user may be stored only in the "electronic commerce system-unusable data", and additionally the "statistics on a commodity browsed by a user" is dynamically generated and stored in the "electronic commerce system-usable data"; if the user allows the electronic commerce system to use the "detailed information about a commodity browsed by a user", the information is stored in the "electronic commerce system-usable data". Authorizing the electronic commerce system to use the statistics is beneficial for the electronic commerce system to normally carry out business of the electronic commerce system on one hand, and can also shield some sensitive information of the user on the other hand.

Refer to the operation interface shown in FIG. 4, which shows an interface for setting data types of the in-transaction information of it. In FIG. 4, in-transaction statistics are set to electronic commerce system-usable data, and an in-transaction detailed record is set to electronic commerce system-unusable data, where the "in-transaction statistics" refer to statistics that are in a process of a transaction and that are under the name of the user, and may be further subdivided into "statistics by traded commodity", "statistics by user ID", "statistics by time period", "statistics by transaction price", and the like; the "in-transaction detailed information" refers to a detailed record that is in a process of a transaction and that is under the name of the user, and statistics at dimensions may be generated on the basis of the complete detailed record. In addition, on the background, in this embodiment of the present invention, access permission on the electronic commerce system-usable data and the electronic commerce system-unusable data are set to be accessible by a user access instruction, and the electronic commerce system-usable data is set to be accessible by all non-user access instructions sent by an electronic commerce system. Therefore, a limitation on access permission of the electronic commerce system on the important data, such as the "in-transaction detailed record", in the in-transaction information is implemented by managing the in-transaction information by category.

Specifically, if the user does not allow the electronic commerce system to use the "in-transaction detailed information", but allows the electronic commerce system to use a portion (for example, the "statistics by traded commodity") of the "in-transaction statistics", a detailed record in a transaction of the user may be stored only in the "electronic commerce system-unusable data", and additionally the "statistics by traded commodity" is dynamically generated and stored in an "electronic commerce system-usable data area"; if the user allows the electronic commerce system to use the "in-transaction detailed information", the information is stored in the "electronic commerce system-usable data area".

Refer to the operation interface shown in FIG. 5, which shows an interface for setting data types of the in-transaction information of it. In FIG. 5, transaction completion statistics are set to electronic commerce system-usable data, and a detailed transaction completion record is set to electronic commerce system-unusable data, where the "transaction completion statistics" refer to statistics that are on a completed transaction and that are under the name of the user, and may be further subdivided into "statistics by traded commodity", "statistics by user ID", "statistics by time period", "statistics by transaction price", and the like; the "detailed transaction completion information" refers to a detailed record that is on a completed transaction and that is under the name of the user, and statistics at dimensions may be generated on the basis of the complete detailed record.

Specifically, if the user does not allow the electronic commerce system to use the "detailed transaction completion information", but allows the electronic commerce system to use a portion (for example, the "statistics by traded commodity") of the "transaction completion statistics", a detailed transaction completion record of the user may be stored only in the "electronic commerce system-unusable data", and additionally the "statistics by traded commodity" is dynamically generated and stored in the "electronic commerce system-usable data"; if the user allows the electronic commerce system to use the "detailed transaction completion information", the information is stored in the "electronic commerce system-usable data".

In a specific implementation, in this embodiment of the present invention, the network service provider-usable data may be stored in a network service provider-usable data area, and the network service provider-unusable data may be stored in a network service provider-unusable data area, where the network service provider-usable data area and the network service provider-unusable data area are independent from each other.

Figure 8:
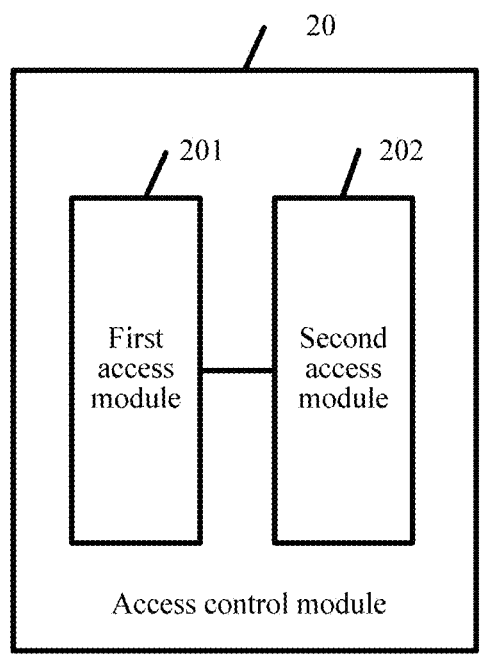
FIG. 8 is a schematic structural composition diagram of an embodiment of an access control module according to an embodiment of the present invention.

In a specific implementation, as shown in FIG. 8, in a feasible implementation manner, the access control module 20 in FIG. 6 and/or FIG. 7 may further include: a first access module 201, configured to: when the access request received by the receiving module 10 is a user access instruction, acquire, from the network service provider-usable data in the network service provider system, data requested by the user access instruction; or when the access request received by the receiving module 10 is a non-user access instruction sent by the network service provider system, acquire, from the network service provider-usable data in the network service provider system, data requested by the non-user access instruction; and a second access module 202, configured to: when the access request received by the receiving module 10 is a user access instruction, acquire, from the network service provider-unusable data in the network service provider system, the data requested by the user access instruction.

In a specific implementation, according to a specific location at which the data requested by the user access instruction is stored, the first access module 201 and/or the second access module 202 performs any one of the following operations.

Operation 4: The first access module 201 acquires, from the network service provider-usable data in the network service provider system, the data requested by the user access instruction. For example, it is assumed that the user access instruction is to view a user ID in basic user information; and then, the first access module 201 may acquire the user ID from the electronic commerce system-usable data in the electronic commerce transaction system.

Operation 5: Acquire, from the network service provider-unusable data in the network service provider system, the data requested by the non-user access instruction sent by the network service provider system. For example, it is assumed that the non-user access instruction is to view a statistical record of commodities browsed by a user; and then, the first access module 201 may acquire, from the electronic commerce system-usable data in the electronic commerce transaction system, the statistical record, of the user, of commodities browsed by the user. In a specific implementation, when a non-user access instruction sent by the network service provider system is for network service provider-unusable data, in this embodiment of the present invention, no response is made to the request.

Operation 6: Acquire, from the network service provider-usable data and the network service provider-unusable data in the network service provider system, the data requested by the user access instruction. For example, it is assumed that the user access instruction is to view a detailed record of commodities browsed by a user and a user ID; and then, the second access module 202 may acquire, from the electronic commerce system-unusable data in the electronic commerce transaction system, the detailed record, of the user, of commodities browsed by the user, and the first access module 201 may acquire the user ID from the electronic commerce system-usable data in the electronic commerce transaction system.

In a specific implementation, in this embodiment of the present invention, the first access module 201 and the second access module 202 may be access interfaces independent from each other. That is, in this embodiment of the present invention, different access interfaces may be set to separately access the network service provider-usable data and the network service provider-unusable data. Therefore, in this embodiment of the present invention, when the data requested by the user access instruction is acquired from the network service provider-usable data or the network service provider-unusable data in the network service provider system, the data requested by the user access instruction may be separately acquired from the network service provider-usable data or the network service provider-unusable data in the network service provider system by using different access interfaces.

Figure 9:
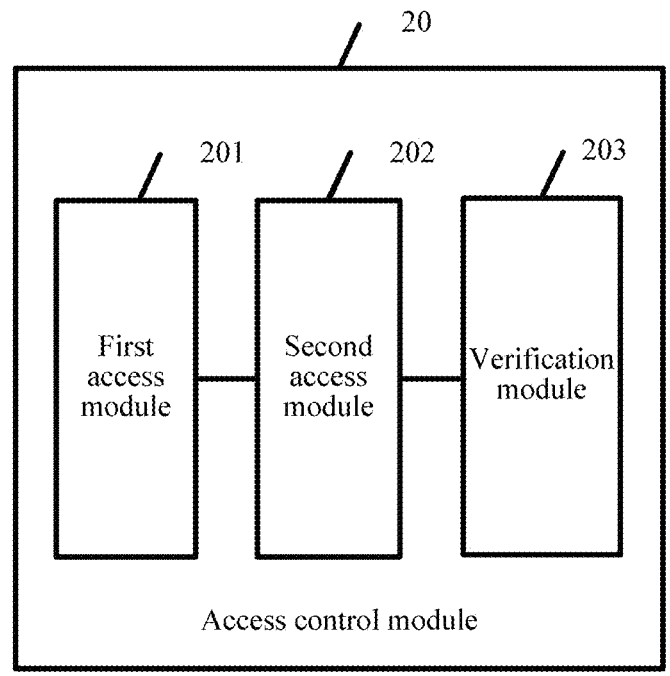
FIG. 9 is a schematic structural composition diagram of another embodiment of an access control module according to an embodiment of the present invention.

Further, as shown in FIG. 9, on the basis of FIG. 8, as another embodiment, the access control module 20 in this embodiment of the present invention may further include: a verification module 203, configured to: before the second access module 202 acquires, from the network service provider-unusable data in the network service provider system, the data requested by the user access instruction, verify whether verification information entered by the user is correct, and if the verification information entered by the user is correct, trigger the second access module 202 to acquire, from the network service provider-unusable data in the network service provider system, the data requested by the user access instruction; or if the verification information entered by the user is incorrect, skip triggering the second access module 202 to acquire, from the network service provider-unusable data in the network service provider system, the data requested by the user access instruction. Therefore, in this embodiment of the present invention, by using an enhanced verification mechanism, security of the data, that is, the network service provider-unusable data is further ensured, and unauthorized access of an unauthorized user is prevented.

In a specific implementation, in another embodiment, the privacy management module 30 in the present invention may be further configured to receive an update instruction entered by a user, and change some of or all of the network service provider-usable data in the network service provider system into network service provider-unusable data according to the update instruction; or receive an update instruction entered by a user, and change some of or all of the network service provider-unusable data in the network service provider system into network service provider-usable data according to the update instruction. Still referring to the operation interfaces shown in FIG. 2 to FIG. 5, in FIG. 2 to FIG. 5, a user may perform sending of an update instruction by operating directional buttons "->" and "<-"; specifically, in FIG. 2 to FIG. 5, when the user clicks a piece of information in electronic commerce system-usable data, and clicks "->", in this embodiment of the present invention, the information clicked by the user may be moved from an "electronic commerce system-usable data" list to an "electronic commerce system-usable data" list according to operations performed by the user; accordingly, when the user clicks a piece of information in electronic commerce system-unusable data, and clicks "<-", in this embodiment of the present invention, the information clicked by the user may be moved from the "electronic commerce system-unusable data" list to the "electronic commerce-usable data" list according to operations performed by the user. For example, in FIG. 2, when a user clicks "user telephone" information in electronic commerce system-usable data, and clicks "->", in this embodiment of the present invention, the "user telephone" clicked by the user may be moved from an "electronic commerce system-usable data" list to an "electronic commerce system-usable data" list according to operations performed by the user; accordingly, when the user clicks "user ID card number" in electronic commerce system-unusable data, and clicks "<-", in this embodiment of the present invention, the "user ID card number" may be moved from the "electronic commerce system-unusable data" list to the "electronic commerce-usable data" list according to operations performed by the user.

Figure 10:
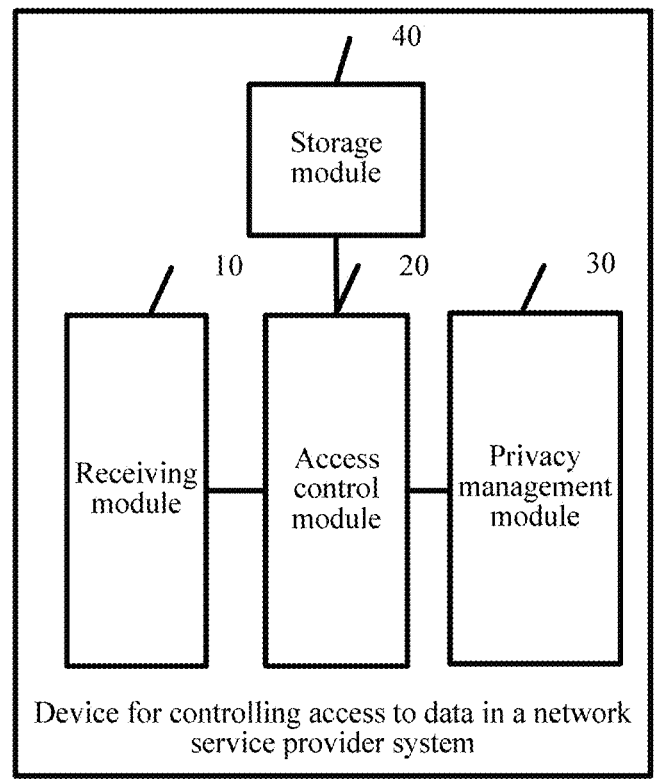
FIG. 10 is a schematic structural composition diagram of another embodiment of a device for controlling access to data in a network service provider system according to an embodiment of the present invention.

In a specific implementation, as shown in FIG. 10, in another embodiment, the device in this embodiment of the present invention may further include: a storage module 40, configured to store network service provider-usable data and network service provider-unusable data. In a feasible implementation manner, the storage module 40 may be specifically configured to store the network service provider-usable data into a network service provider-usable data area, and store the network service provider-unusable data into a network service provider-unusable data area, where locations, in the storage module 40, of the network service provider-usable data area and the network service provider-unusable data area are independent from each other.

In a specific implementation, the access control module 20 in FIG. 10 may similarly include the structure in FIG. 8 or FIG. 9.

It can be seen from the foregoing that, by means of the device in this embodiment of the present invention, when a received access request of accessing data in the network service provider system is a user access instruction, data requested by the user access instruction may be acquired from network service provider-usable data or network service provider-unusable data in the network service provider system, and when a received access request of accessing data in the network service provider system is a non-user access instruction sent by the network service provider system, data requested by the non-user access instruction is acquired from only network service provider-usable data in the network service provider system, that is, in this embodiment of the present invention, the non-user access instruction sent by the network service provider system can access only the network service provider-usable data, and cannot access the network service provider-unusable data. In this way, in this embodiment of the present invention, access by a network service provider to some data in the network service provider system can be limited, to protect data privacy; data that is not expected to be accessed by the network service provider simply needs to be set to network service provider-unusable data, and then, an effect of protecting privacy of the data may be achieved by implementing this embodiment of the present invention.

Figure 11:
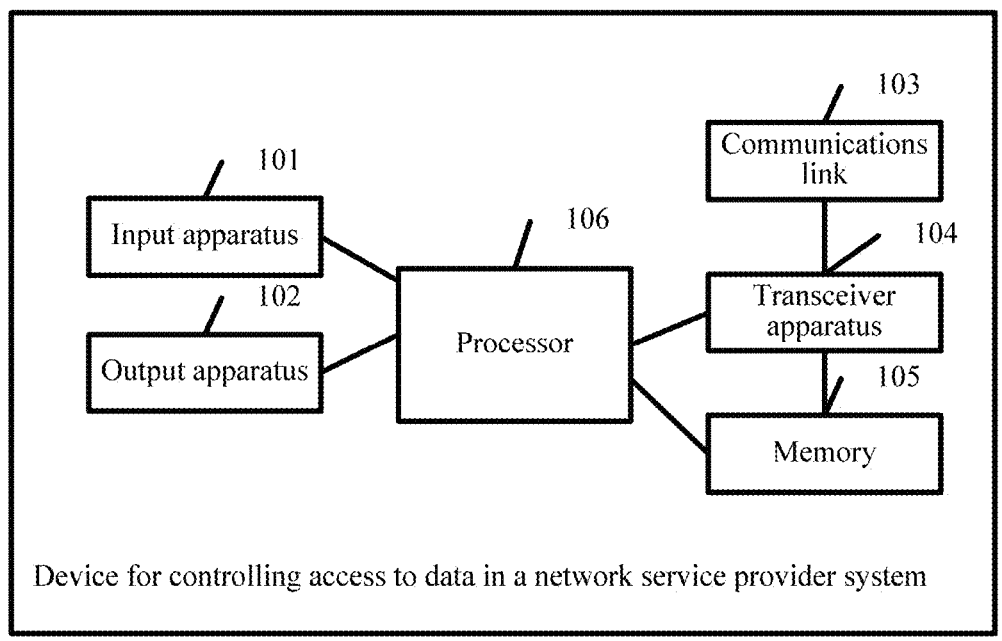
FIG. 11 is a schematic structural composition diagram of another embodiment of a device for controlling access to data in a network service provider system according to an embodiment of the present invention.

FIG. 11 is a schematic structural composition diagram of another embodiment of a device for controlling access to data in a network service provider system according to an embodiment of the present invention. As shown in FIG. 11, the device may include: an input apparatus 101, an output apparatus 102, a communications link 103, a transceiver apparatus 104, a memory 105, and a processor 106. The input apparatus 101 is configured to receive input data that is input to the device for controlling access to data in a network service provider system from outside; in a specific implementation, the input apparatus 101 in this embodiment of the present invention may include a keyboard, a mouse, a photoelectric input apparatus, a sound input apparatus, a touch input apparatus, a scanner, or the like. The output device 102 is configured to output, to the outside, output data of the device for controlling access to data in a network service provider system; in a specific implementation, the output apparatus 102 in this embodiment of the present invention may include a display, a loudspeaker, a printer, or the like. The communications link 103 is configured to communicate with another device; in a specific implementation, the communications link 103 in this embodiment of the present invention may be an example of a propagation medium; the propagation medium may generally reify a computer readable instruction, a data structure, a program module, or other data in another modulated data signal (such as a carrier or another transport mechanism) form; for example, the propagation medium may include a wired medium such as a wired network or a straight line connection, and the propagation medium may further include a wireless medium such as a sound wave, a radio frequency, or an infrared ray; in a specific implementation, the communications link 103 in this embodiment of the present invention may be configured to receive an access request of accessing the data in the network service provider system. The transceiver apparatus 104 is configured to send data to another device or receive data from another device by using the communications link 103; in a specific implementation, the transceiver apparatus 104 in this embodiment of the present invention may include a transceiver device such as a radio frequency antenna. The memory 105 is configured to store program data that has various functions; in this embodiment of the present invention, where the data stored in the memory 105 includes network service provider-usable data, network service provider-unusable data, and other program data that can be invoked and run; in a specific implementation, the memory 105 in this embodiment of the present invention may be a system memory, for example, a volatile memory (such as a RAM), a non-volatile memory (such as a ROM or a flash memory), or a combination of the two; in a specific implementation, the memory 105 in this embodiment of the present invention may further be an external memory outside the system, for example, a magnetic disk, an optic disc, or a magnetic tape. The processor 106 is configured to invoke the program data stored in the memory 106, and perform the following operations: when the access request received by the transceiver apparatus 104 is a user access instruction, acquiring, from network service provider-usable data or network service provider-unusable data in the network service provider system, data requested by the user access instruction; or when the access request received by the transceiver apparatus 104 is a non-user access instruction sent by the network service provider system, acquiring, from network service provider-usable data in the network service provider system, data requested by the non-user access instruction.

In a specific implementation, the network service provider in this embodiment of the present invention may include an Internet service provider (ISP) and an owner, other than two transactional parties, of an electronic commerce transaction system (which may be briefly referred to as an electronic commerce system) in an electronic commerce (EC) activity. Generally, the Internet service provider refers to a company that provides an Internet service, can provide services such as a dial-up access service, on-line browsing, file downloading, and email receiving and sending, and is an entrance and a bridge for a network end user to access the Internet. The ISP provides an Internet connection service to families and commercial users. There are four types of ISPs: a local ISP, a regional ISP, a national ISP, and a global ISP. The ISP is generally a local service provider, and provides Internet access and support to a customer. The regional and national providers that provide bandwidth, transfer, and routing services are more properly referred to as NSPs (network service providers). In most cases, an interconnection scheme is hierarchical, where the local ISP accesses the regional NSP, and then, successively accesses the national and global NSPs. Generally, the electronic commerce refers to: business and trade activities carried out globally by using electronic tools such as the Internet (these tools include telegram, telephone, broadcast, television, fax, computer, computer network, mobile communication, and the like). The electronic commerce transaction system refers to a totality of information network systems that provide, in an electronic commerce activity, a service of making a match for a transaction and a related service to two parties or multiple parties of the transaction.

In a specific implementation, more or less personal information, for example, a network account of a user, a name of the user, contact information, a purchase record and a payment record of the user, and the like, of the user remains in the network service provider system due to login by the user to a website, performing of an electronic commerce activity, downloading of a file, or the like. If no limitation is performed on the foregoing personal information of the user, a network service provider may use the personal information to carry out a commercial activity such as data mining, for example, leaking the name, a telephone number, a contact address, or the like, of the user. Abuse of the privacy affects healthy development of the entire Internet industry. In view of this, in this embodiment of the present invention, a limitation on access permission of a network service provider on some important data is implemented by managing data in a network service provider system by category.

In a specific implementation, in this embodiment of the present invention, in step S110, the received access request of accessing the data in the network service provider system may be a user access instruction that is sent to the network service provider system by a user after the user logs in to the network service provider system (for example, an electronic commerce transaction system such as Taobao) by using a user terminal device. The user access instruction may include all information, such as a query for a transaction record, a query for a product information browsing history record, statistics on a quantity of purchased commodities, and personal registration materials of the user, that is related to the user and that may be stored in the network service provider system. For example, a received access request may be an access instruction sent by the user to view a commodity browsing record. Certainly, in this embodiment of the present invention, in step Silo, the received access request of accessing the data in the network service provider system may be a non-user access instruction sent by a controller (for example, a data administrator of the electronic commerce transaction system) of the network service provider system by using a non-user interaction module in the network service provider system. For the electronic commerce transaction system, these non-user interaction modules may include: a data mining module, a user marketing module, an advertisement push module, and the like. These non-user access instructions may include: any access instruction that can be used by these modules, such as an instruction to query a quantity of sellers or an instruction to view a user ID.

In a specific implementation, a limitation on access permission of a network service provider on some important data is implemented by managing data in a network service provider system by category. In some feasible implementation manners, the processor 106 in this embodiment of the present invention may further perform the following steps: receiving a setting instruction entered by a user, and dividing data in the network service provider system into data types according to the setting instruction, where the data types include: network service provider-usable data or network service provider-unusable data; setting access permission on the network service provider-usable data to be accessible by both the user access instruction and the non-user access instruction that is sent by the network service provider system; and setting access permission on the network service provider-unusable data to be accessible by the user access instruction. Using an electronic commerce transaction system as an example, a user (including either of two parties of a transaction) may log in to the electronic commerce transaction system, and perform division of data types and setting of access permission on network service provider-usable data and network service provider-unusable data are performed on related operation interfaces. In a specific implementation, when or after the user logs in to the network service provider system to perform a network operation and the network service provider system generates operation data, the processor 106 in this embodiment of the present invention may divide the operation data generated by the network service provider system into data types according to the setting instruction, where the data types include: network service provider-usable data or network service provider-unusable data. Using an electronic commerce transaction system as an example, a user (including either of two parties of a transaction) may log in to the electronic commerce transaction system, and perform a network operation, such as commodity browsing or commodity purchasing, in the electronic commerce transaction system; when the network operation such as the commodity browsing or the commodity purchasing is performed, operation information such as a browsing record and a purchasing record is generated in the electronic commerce transaction system; therefore, in this embodiment of the present invention, in or after a process in which the user performs the network operation, such as the commodity browsing or the commodity purchasing, in the electronic commerce transaction system, the user (including either of the two parties of the transaction) logs in to the electronic commerce transaction system, and a setting instruction of the user is received on a related operation interface provided by the electronic commerce transaction system, to perform division of data types and setting of access permission on network service provider-usable data and network service provider-unusable data. For example, operation interfaces shown in FIG. 2 to FIG. 5 show schematic diagrams for a transaction party of electronic commerce to set data types of and access permission on, in an electronic commerce transaction system, various data generated by an electronic commerce activity performed by the transaction party.

Specifically, referring to the operation interface shown in FIG. 2, data generated by an electronic commerce transaction activity of a user is roughly divided into basic user information, pre-transaction information, in-transaction information, and post-transaction information. In FIG. 2, data types of the basic user information are set, where in the basic information, information such as a user ID, a user nickname, and a user address is set to electronic commerce system-usable data, and important information, such as a real user name and a user ID card number, related to user privacy, is set to electronic commerce system-unusable data. In addition, on a background, in this embodiment of the present invention, access permission on the electronic commerce system-usable data and the electronic commerce system-unusable data are set to be accessible by a user access instruction, and the electronic commerce system-usable data is set to be accessible by all non-user access instructions sent by an electronic commerce system. Therefore, a limitation on access permission of the electronic commerce system on the important data, such as the real user name and the user ID card number, in the basic user information is implemented by managing the basic user information by category.

Refer to the operation interface shown in FIG. 3, which shows an interface for setting data types of the pre-transaction information of it. In FIG. 3, statistics on a commodity browsed by a user are set to electronic commerce system-usable data, and a detailed record of a commodity browsed by a user is set to electronic commerce system-unusable data, where the "statistics on a commodity browsed by a user" refer to statistics on browsing information before the user purchases a commodity before ordering, and may be further subdivided into "statistics by browsed commodity", "statistics by user ID", "statistics by time period", and the like; the "detailed information about a commodity browsed by a user" refers to a complete detailed record of browsing information before the user purchases a commodity before ordering, and statistics at dimensions may be generated on the basis of the complete detailed record. In addition, on the background, in this embodiment of the present invention, access permission on the electronic commerce system-usable data and the electronic commerce system-unusable data are set to be accessible by a user access instruction, and the electronic commerce system-usable data is set to be accessible by all non-user access instructions sent by an electronic commerce system. Therefore, a limitation on access permission of the electronic commerce system on the important data, such as the "detailed record of a commodity browsed by a user", in the pre-transaction information is implemented by managing the pre-transaction information by category.

Specifically, if the user does not allow the electronic commerce system to use the "detailed information about a commodity browsed by a user", but allows the electronic commerce system to use a portion (for example, the "statistics by browsed commodity") of the "statistics on a commodity browsed by a user", a detailed record of a browsing process of the user may be stored only in the "electronic commerce system-unusable data", and additionally the "statistics on a commodity browsed by a user" is dynamically generated and stored in the "electronic commerce system-usable data"; if the user allows the electronic commerce system to use the "detailed information about a commodity browsed by a user", the information is stored in the "electronic commerce system-usable data". Authorizing the electronic commerce system to use the statistics is beneficial for the electronic commerce system to normally carry out business of the electronic commerce system on one hand, and can also shield some sensitive information of the user on the other hand.

Refer to the operation interface shown in FIG. 4, which shows an interface for setting data types of the in-transaction information of it. In FIG. 4, in-transaction statistics are set to electronic commerce system-usable data, and an in-transaction detailed record is set to electronic commerce system-unusable data, where the "in-transaction statistics" refer to statistics that are in a process of a transaction and that are under the name of the user, and may be further subdivided into "statistics by traded commodity", "statistics by user ID", "statistics by time period", "statistics by transaction price", and the like; the "in-transaction detailed information" refers to a detailed record that is in a process of a transaction and that is under the name of the user, and statistics at dimensions may be generated on the basis of the complete detailed record. In addition, on the background, in this embodiment of the present invention, access permission on the electronic commerce system-usable data and the electronic commerce system-unusable data are set to be accessible by a user access instruction, and the electronic commerce system-usable data is set to be accessible by all non-user access instructions sent by an electronic commerce system. Therefore, a limitation on access permission of the electronic commerce system on the important data, such as the "in-transaction detailed record", in the in-transaction information is implemented by managing the in-transaction information by category.

Specifically, if the user does not allow the electronic commerce system to use the "in-transaction detailed information", but allows the electronic commerce system to use a portion (for example, the "statistics by traded commodity") of the "in-transaction statistics", a detailed record in a transaction of the user may be stored only in the "electronic commerce system-unusable data", and additionally the "statistics by traded commodity" is dynamically generated and stored in an "electronic commerce system-usable data area"; if the user allows the electronic commerce system to use the "in-transaction detailed information", the information is stored in the "electronic commerce system-usable data area".

Refer to the operation interface shown in FIG. 5, which shows an interface for setting data types of the in-transaction information of it. In FIG. 5, transaction completion statistics are set to electronic commerce system-usable data, and a detailed transaction completion record is set to electronic commerce system-unusable data, where the "transaction completion statistics" refer to statistics that are on a completed transaction and that are under the name of the user, and may be further subdivided into "statistics by traded commodity", "statistics by user ID", "statistics by time period", "statistics by transaction price", and the like; the "detailed transaction completion information" refers to a detailed record that is on a completed transaction and that is under the name of the user, and statistics at dimensions may be generated on the basis of the complete detailed record.

Specifically, if the user does not allow the electronic commerce system to use the "detailed transaction completion information", but allows the electronic commerce system to use a portion (for example, the "statistics by traded commodity") of the "transaction completion statistics", a detailed transaction completion record of the user may be stored only in the "electronic commerce system-unusable data", and additionally the "statistics by traded commodity" is dynamically generated and stored in the "electronic commerce system-usable data"; if the user allows the electronic commerce system to use the "detailed transaction completion information", the information is stored in the "electronic commerce system-usable data".

In a specific implementation, in this embodiment of the present invention, the network service provider-usable data may be stored in a network service provider-usable data area, and the network service provider-unusable data may be stored in a network service provider-unusable data area, where the network service provider-usable data area and the network service provider-unusable data area are independent from each other.

In a specific implementation, according to a specific location at which the data requested by the user access instruction is stored, when the processor 106 performs, when the access request is a user access instruction, acquiring, from network service provider-usable data or network service provider-unusable data in the network service provider system, data requested by the user access instruction, the processor 106 may specifically perform any one of the following operations.

Operation 1: Acquire, from the network service provider-usable data in the network service provider system, the data requested by the user access instruction. For example, it is assumed that the user access instruction is to view a user ID in basic user information; and then, the processor 106 may acquire the user ID from the electronic commerce system-usable data in the electronic commerce transaction system.

Operation 2: Acquire, from the network service provider-unusable data in the network service provider system, the data requested by the user access instruction. For example, it is assumed that the user access instruction is to view a detailed record of commodities browsed by a user; and then, the processor 106 may acquire, from the electronic commerce system-unusable data in the electronic commerce transaction system, the detailed record, of the user, of commodities browsed by the user.

Operation 3: Acquire, from the network service provider-usable data and the network service provider-unusable data in the network service provider system, the data requested by the user access instruction. For example, it is assumed that the user access instruction is to view a detailed record of commodities browsed by a user and a user ID; and then, the processor 106 may acquire, from the electronic commerce system-unusable data in the electronic commerce transaction system, the detailed record, of the user, of commodities browsed by the user, and may acquire the user ID from the electronic commerce system-usable data in the electronic commerce transaction system.

In a specific implementation, in this embodiment of the present invention, when the data requested by the user access instruction is acquired from the network service provider-usable data or the network service provider-unusable data in the network service provider system, the processor 106 may separately acquire, from the network service provider-usable data or the network service provider-unusable data in the network service provider system by using different access interfaces, the data requested by the user access instruction. That is, in this embodiment of the present invention, different access interfaces may be set to separately access the network service provider-usable data and the network service provider-unusable data.

In a specific implementation, in this embodiment of the present invention, before acquiring, from the network service provider-unusable data in the network service provider system, the data requested by the user access instruction, the processor 106 may further perform the following steps: verifying verification information entered by the user, and if the verification information entered by the user is correct, acquiring, from the network service provider-unusable data in the network service provider system, the data requested by the user access instruction; otherwise, skipping acquiring, from the network service provider-unusable data in the network service provider system, the data requested by the user access instruction. In this embodiment of the present invention, by using an enhanced verification mechanism, security of the data, that is, the network service provider-unusable data is further ensured, and unauthorized access of an unauthorized user is prevented.

In a specific implementation, the processor 106 may further invoke a program stored in the memory 105, receive an update instruction entered by a user, and change some of or all of the network service provider-usable data in the network service provider system into network service provider-unusable data according to the update instruction; or receive an update instruction entered by a user, and change some of or all of the network service provider-unusable data in the network service provider system into network service provider-usable data according to the update instruction. Still referring to the operation interfaces shown in FIG. 2 to FIG. 5, in FIG. 2 to FIG. 5, a user may perform sending of an update instruction by operating directional buttons "->" and "<-"; specifically, in FIG. 2 to FIG. 5, when the user clicks a piece of information in electronic commerce system-usable data, and clicks "->", in this embodiment of the present invention, the information clicked by the user may be moved from an "electronic commerce system-usable data" list to an "electronic commerce system-usable data" list according to operations performed by the user; accordingly, when the user clicks a piece of information in electronic commerce system-unusable data, and clicks "<-", in this embodiment of the present invention, the information clicked by the user may be moved from the "electronic commerce system-unusable data" list to the "electronic commerce-usable data" list according to operations performed by the user. For example, in FIG. 2, when a user clicks "user telephone" information in electronic commerce system-usable data, and clicks "->", in this embodiment of the present invention, the "user telephone" clicked by the user may be moved from an "electronic commerce system-usable data" list to an "electronic commerce system-usable data" list according to operations performed by the user; accordingly, when the user clicks "user ID card number" in electronic commerce system-unusable data, and clicks "<-", in this embodiment of the present invention, the "user ID card number" may be moved from the "electronic commerce system-unusable data" list to the "electronic commerce-usable data" list according to operations performed by the user.

In a specific implementation, in this embodiment of the present invention, an operation, for example, dividing, according to a setting instruction of a user, data in the network service provider system into data types, where the data types include: network service provider-usable data or network service provider-unusable data; or changing some of or all of the network service provider-usable data in the network service provider system into network service provider-unusable data according to an update instruction of a user; or changing some of or all of the network service provider-unusable data in the network service provider system into network service provider-usable data according to an update instruction of a user, may occur before the access request of accessing the data in the network service provider system is received, where the received access request of accessing the data in the network service provider system may be an access request received for the first time or an access request subsequently received.

It can be seen that, by means of the device in this embodiment of the present invention, when a received access request of accessing data in the network service provider system is a user access instruction, data requested by the user access instruction may be acquired from network service provider-usable data or network service provider-unusable data in the network service provider system, and when a received access request of accessing data in the network service provider system is a non-user access instruction sent by the network service provider system, data requested by the non-user access instruction is acquired from only network service provider-usable data in the network service provider system, that is, in this embodiment of the present invention, the non-user access instruction sent by the network service provider system can access only the network service provider-usable data, and cannot access the network service provider-unusable data. In this way, in this embodiment of the present invention, access by a network service provider to some data in the network service provider system can be limited, to protect data privacy; data that is not expected to be accessed by the network service provider simply needs to be set to network service provider-unusable data, and then, an effect of protecting privacy of the data may be achieved by implementing this embodiment of the present invention.

In addition, an embodiment of the present invention further provides a computer storage medium, where the computer storage medium may store a program, and, when the program is executed, a part or all of the steps of the embodiments of the method provided in the present invention may be performed. In a specific implementation, the computer storage medium in this embodiment of the present invention includes: a RAM, a ROM, an EEPROM, a flash memory, a CD-ROM, a DVD, or another optical memory, a magnetic tape, a magnetic disk, or another magnetic memory, or any other medium that can be configured to store needed information and that can be accessed by a computer device.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

The foregoing descriptions are merely exemplary embodiments of the present invention, but are not intended to limit the protection scope of the present invention. Any equivalent modifications made according to the claims of the present invention still fall within the scope of the present invention.

What is claimed is:

1. A method, comprising:
   receiving an access request for accessing data in a network service provider system, the network service provider system comprising a plurality of data areas, a network service provider-usable data area of the plurality of data areas storing network service provider-usable data, a network service provider-unusable data area of the plurality of data areas storing network service provider-unusable data, the network service provider-usable data area being independent from the network service provider-unusable data area; and
   in response to determining that the access request is a user access instruction, acquiring, from the network service provider-usable data of the network service provider-usable data area or the network service provider-unusable data of the network service provider-unusable data area, data requested by the user access instruction; or
   in response to determining that the access request is a non-user access instruction, acquiring, from the network service provider-usable data of the network service provider-usable data area, data requested by the non-user access instruction.

2. The method according to claim 1, further comprising:
   setting access permission on the network service provider-usable data to be accessible by the user access instruction and the non-user access instruction; and
   setting access permission on the network service provider-unusable data to be accessible by the user access instruction and inaccessible by the non-user access instruction.

3. The method according to claim 2, further comprising:
   receiving a setting instruction; and
   dividing, according to the setting instruction, data in the network service provider system into data types, wherein the data types comprise network service provider-usable data or network service provider-unusable data.

4. The method according to claim 3, wherein dividing data comprises:
   generating, by the network service provider system, operation data as a result of performing a network operation; and
   dividing, according to the setting instruction, the operation data into the data types.

5. The method according to claim 2, further comprising:
   receiving an update instruction; and
   changing, according to the update instruction, a portion of the network service provider-usable data in the network service provider system into network service provider-unusable data.

6. The method according to claim 2, further comprising:
   receiving an update instruction; and
   changing, according to the update instruction, a portion of the network service provider-unusable data in the network service provider system into network service provider-usable data.

7. The method according to claim 1, further comprising:
   when the data requested by the user access instruction comprises network service provider-usable data and network service provider-unusable data separately acquiring, from the network service provider-usable data area using a first access interface, the network service provider-usable data and separately acquiring, from the network service provider-unusable data area using a second access interface, the network service provider-unusable data, wherein the first access interface and the second access interface are different access interfaces.

8. The method according to claim 1, further comprising:
   verifying verification information entered by a user, and when the verification information entered by the user is correct, acquiring, from the network service provider-unusable data of the network service provider-unusable data area, the data requested by the user access instruction; and when the verification information entered by the user is incorrect, skipping acquiring, from the network service provider-unusable data of the network service provider-unusable data area, the data requested by the user access instruction.

9. A device, comprising:
   a receiver, configured to receive an access request for accessing data in a network service provider system, the network service provider system comprising a plurality of data areas, a network service provider-usable data area of the plurality of data areas storing network service provider-usable data, a network service provider-unusable data area of the plurality of data areas storing network service provider-unusable data, the network service provider-usable data area being independent from the network service provider-unusable data area;
   a processor; and
   a non-transitory computer-readable storage medium storing a program to be executed by the processor, the program including instructions for:
      in response to determining that the access request is a user access instruction, acquire, from the network service provider-usable data of the network service provider-usable data area or the network service provider-unusable data of the network service provider-unusable data area, data requested by the user access instruction; or
      in response to determining that the access request is a non-user access instruction, acquire, from the network service provider-usable data of the network service provider-usable data area, data requested by the non-user access instruction.

10. The device according to claim 9, wherein the program further includes instructions for:
    setting access permission on the network service provider-usable data to be accessible by the user access instruction and the non-user access instruction; and setting access permission on the network service provider-unusable data to be accessible by the user access instruction and inaccessible by the non-user access instruction.

11. The device according to claim 10, wherein the program further includes instructions for:
    receiving a setting instruction; and
    dividing, according to the setting instruction, data in the network service provider system into data types, wherein the data types comprise network service provider-usable data or network service provider-unusable data.

12. The device according to claim 11, wherein the program further includes instructions for:
    generating, by the network service provider system, operation data as a result of performing a network operation; and
    dividing, according to the setting instruction, the operation data into the data types.

13. The device according to claim 10, wherein the program further includes instructions for:
    receiving an update instruction; and
    changing, according to the update instruction, a portion of the network service provider-usable data in the network service provider system into network service provider-unusable data.

14. The device according to claim 10, wherein the program further includes instructions for:
    receiving an update instruction; and
    changing, according to the update instruction, a portion of the network service provider-unusable data in the network service provider system into network service provider-usable data.

15. The device according to claim 9, wherein:
    instructions to acquire network service provider-usable data from the network service provider-usable data area comprise instructions to acquire network service provider-usable data from the network service provider-usable data area using a first access interface; and
    instructions to acquire network service provider-unusable data from the network service provider-unusable data area comprise instructions to acquire network service provider-unusable data from the network service provider-unusable data area using a second access interface.

16. The device according to claim 15, wherein the first access interface and the second access interface are independent from each other.

17. The device according to claim 15, wherein the program further includes instructions for:
    verifying whether verification information entered by a user is correct, and when the verification information entered by the user is correct, acquiring, from the network service provider-unusable data of the network service provider-unusable data area, the data requested by the user access instruction; and when the verification information entered by the user is incorrect, skipping acquiring, from the network service provider-unusable data of the network service provider-unusable data area, the data requested by the user access instruction.

18. The device according to claim 9, further comprising:
    a storage device, configured to store the network service provider-usable data into the network service provider-usable data area, and store the network service provider-unusable data into the network service provider-unusable data area, wherein locations, in the storage device, of the network service provider-usable data area and the network service provider-unusable data area are independent from each other.

* * * * *